United States Patent
Ohta et al.

(10) Patent No.: US 11,600,826 B2
(45) Date of Patent: Mar. 7, 2023

(54) ALL-SOLID-STATE BATTERY POSITIVE ELECTRODE AND ALL-SOLID-STATE BATTERY

(71) Applicant: HONDA MOTOR CO., LTD., Tokyo (JP)

(72) Inventors: Masahiro Ohta, Wako (JP); Wataru Shimizu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 16/835,367

(22) Filed: Mar. 31, 2020

(65) Prior Publication Data
US 2020/0328428 A1 Oct. 15, 2020

(30) Foreign Application Priority Data
Apr. 10, 2019 (JP) .............................. JP2019-074860

(51) Int. Cl.
| | |
|---|---|
| *H01M 4/70* | (2006.01) |
| *H01M 4/66* | (2006.01) |
| *H01M 4/64* | (2006.01) |
| *H01M 10/0525* | (2010.01) |
| *H01M 10/04* | (2006.01) |
| *H01M 10/34* | (2006.01) |
| *H01M 4/02* | (2006.01) |

(52) U.S. Cl.
CPC .............. *H01M 4/70* (2013.01); *H01M 4/64* (2013.01); *H01M 4/661* (2013.01); *H01M 10/0431* (2013.01); *H01M 10/0525* (2013.01); *H01M 10/347* (2013.01); *H01M 2004/021* (2013.01); *H01M 2004/028* (2013.01)

(58) Field of Classification Search
CPC ............ H01M 4/04; H01M 4/70; H01M 4/66; H01M 10/0525; H01M 10/04
See application file for complete search history.

(56) References Cited

U.S. PATENT DOCUMENTS

| | | | |
|---|---|---|---|
| 2002/0197535 A1* | 12/2002 | Dudley | H01M 50/183 427/407.1 |
| 2010/0028767 A1* | 2/2010 | Inose | H01M 10/0525 29/623.2 |

(Continued)

FOREIGN PATENT DOCUMENTS

| | | |
|---|---|---|
| CN | 108695548 | 10/2018 |
| JP | 2008-293793 | 12/2008 |

(Continued)

OTHER PUBLICATIONS

Japanese Office Action for Japanese Patent Application No. 2019-074860 dated Feb. 15, 2022.

(Continued)

*Primary Examiner* — Kenneth J Douyette
(74) *Attorney, Agent, or Firm* — Amin, Turocy & Watson, LLP

(57) ABSTRACT

An all-solid-state battery positive electrode 20 includes a positive electrode current collector 21 and a positive electrode active material layer 22 laminated on the positive electrode current collector 21. The positive electrode active material layer 22 includes an inclined portion 50 (a first inclined portion 50A) provided on an outer circumference thereof.

8 Claims, 10 Drawing Sheets

(56) References Cited

U.S. PATENT DOCUMENTS

| 2016/0181650 | A1* | 6/2016 | Ide | H01M 10/052 |
| | | | | 429/211 |
| 2018/0277816 | A1* | 9/2018 | Minagata | H01M 4/139 |
| 2018/0277850 | A1* | 9/2018 | Quero-Mieres | H01M 4/622 |

FOREIGN PATENT DOCUMENTS

| JP | 2011-065913 | 3/2011 |
| JP | 2011-146219 | 7/2011 |
| JP | 2013-182842 | 9/2013 |
| JP | 5354646 | 11/2013 |
| JP | 2015-118870 | 6/2015 |
| WO | 2012/124188 | 9/2012 |
| WO | 2017/072898 | 5/2017 |

OTHER PUBLICATIONS

Chinese Office Action for Chinese Patent Application No. 202010233544.8 dated Dec. 1, 2022.

* cited by examiner

ALL-SOLID-STATE BATTERY POSITIVE ELECTRODE AND ALL-SOLID-STATE BATTERY

CROSS-REFERENCE TO RELATED APPLICATION

Priority is claimed on Japanese Patent Application No. 2019-074860, filed Apr. 10, 2019, the content of which is incorporated herein by reference.

BACKGROUND OF THE INVENTION

Field of the Invention

The present disclosure relates to an all-solid-state battery positive electrode and all-solid-state battery.

Description of Related Art

In order to secure and maintain a performance at the time of design, an all-solid-state battery, in a state in which a laminate is formed by laminating a positive electrode, a solid electrolyte layer, and a negative electrode, needs to be press-formed at a high surface pressure to have a high bonding force and maintain the bonding state thereafter. As such a manufacturing method, for example, a manufacturing method in which a sheet with a solid electrolyte disposed on an upper surface of a sheet of an electrode mixture in which the electrode mixture is applied on both surfaces of a current collector foil is cut into an arbitrary shape, and a positive electrode and a negative electrode are alternately laminated and then press-formed has been proposed (Patent Document 1).

On the other hand, as can be seen in conventional lithium ion batteries (aqueous LIBs) or the like, when a battery having a laminated structure in which punched electrodes are laminated is formed, in order to avoid a risk of electrolytic deposition of lithium which may occur due to a positional deviation of electrodes, generally, electrodes are laminated such that an area of a negative electrode is larger than an area of a positive electrode (Patent Document 2).

PATENT DOCUMENTS

[Patent Document 1] Japanese Unexamined Patent Application, First Publication No. 2015-118870
[Patent Document 2] Japanese Patent Publication No. 5354646

SUMMARY OF THE INVENTION

However, in the manufacturing method in which a positive electrode and a negative electrode are alternately laminated and press-formed as an assembly package of an all-solid-state battery as in Patent Document 1, when the positive electrode and the negative electrode are different in size as in Patent Document 2 described above, it is difficult to align the positive electrodes and the negative electrodes alternately laminated and a solid electrolyte layer interposed therebetween, and a relative positional deviation between the positive electrode, the solid electrolyte layer, and the negative electrode is likely to occur. Also, at the time of press forming of the all-solid-state battery, a pressed portion to which pressure is applied via the positive electrode and an unpressed portion to which pressure is not applied occur in the solid electrolyte layer, cracks or defects may occur in the vicinity of these boundary portions, particularly at an end portion of the solid electrolyte layer, and there is a problem in that a yield is reduced. On the other hand, when the pressure at the time of press forming is reduced to reduce the risk of cracks, defects, or the like that may occur in the solid electrolyte layer, an initial performance, deterioration characteristics, and furthermore, an energy density of the all-solid-state battery may worsen.

An objective of the present disclosure is to provide an all-solid-state battery positive electrode and an all-solid-state battery capable of improving a yield of an all-solid-state battery and achieving improvement in initial performance, deterioration characteristics, and furthermore, an energy density.

In order to achieve the above-described objective, the present disclosure provides the following methods.

[1] An all-solid-state battery positive electrode including a positive electrode current collector, and a positive electrode active material layer formed on the positive electrode current collector, in which the positive electrode active material layer includes an inclined portion provided on an outer circumference thereof.

[2] The all-solid-state battery positive electrode according to the above-described [1] in which the positive electrode active material layer includes a first positive electrode active material layer formed on one main surface of the positive electrode current collector, the inclined portion includes at least two first inclined portions formed on the first positive electrode active material layer, and the first inclined portions are provided at least on an outer circumference of two sides of the first positive electrode active material layer facing each other.

[3] The all-solid-state battery positive electrode according to the above-described [2] in which the first positive electrode active material layer has a rectangular shape in a plan view, and the first inclined portion is provided on an outer circumference of four sides of the first positive electrode active material layer.

[4] The all-solid-state battery positive electrode according to the above-described [2] in which an inclination angle of the first inclined portion is 75° or more and 87° or less with respect to an in-plane direction of the first positive electrode active material layer.

[5] The all-solid-state battery positive electrode according to the above-described [2] in which the positive electrode active material layer further includes a second positive electrode active material layer formed on the other main surface of the positive electrode current collector, the inclined portion further includes a second inclined portion formed on the second positive electrode active material layer, and the second inclined portion is provided at least on an outer circumference of two sides of the second positive electrode active material layer facing each other.

[6] The all-solid-state battery positive electrode according to the above-described [5] in which the second positive electrode active material layer has a rectangular shape in a plan view, and the second inclined portion is provided on an outer circumference of four sides of the second positive electrode active material layer.

[7] The all-solid-state battery positive electrode according to the above-described [5] in which an inclination angle of the second inclined portion is 75° or more and 87° or less with respect to an in-plane direction of the second positive electrode active material layer.

[8] The all-solid-state battery positive electrode according to the above-described [5] in which the inclined portion is configured as a tapered portion defined by the first inclined portion and the second inclined portion in a side view of the all-solid-state battery positive electrode.

[9] An all-solid-state battery including an all-solid-state battery positive electrode including a positive electrode active material layer formed on a positive electrode current collector, an all-solid-state battery negative electrode including a negative electrode active material layer formed on a negative electrode current collector, and a solid electrolyte layer disposed between the all-solid-state battery positive electrode and the all-solid-state battery negative electrode, in which the positive electrode active material layer includes a plurality of inclined portions provided on an outer circumference thereof.

[10] The all-solid-state battery according to the above-described [9] in which areas of the all-solid-state battery positive electrode and the all-solid-state battery negative electrode are substantially the same on a plane of projection when they are projected in a lamination direction.

[11] The all-solid-state battery according to the above-described [9] in which the all-solid-state battery positive electrode includes the positive electrode current collector in an elongated shape, and a plurality of the positive electrode active material layers formed on at least one main surface of the positive electrode current collector and formed intermittently in a longitudinal direction thereof, and the all-solid-state battery negative electrode includes the negative electrode current collector in an elongated shape, and one or a plurality of the negative electrode active material layers formed on at least one main surface of the negative electrode current collector and formed continuously or intermittently in a longitudinal direction thereof.

[12] The all-solid-state battery according to the above-described [11] in which the all-solid-state battery positive electrode and the all-solid-state battery negative electrode are wound in a flat shape.

[13] The all-solid-state battery according to the above-described [11] in which the positive electrode active material layer includes a first positive electrode active material layer formed on one main surface of the positive electrode current collector, the inclined portion includes at least two first inclined portions formed on the first positive electrode active material layer, and the first inclined portions are provided at least on an outer circumference of two sides of the first positive electrode active material layer facing each other.

[14] The all-solid-state battery according to the above-described [13] in which the all-solid-state battery positive electrode, the all-solid-state battery negative electrode, and the first positive electrode active material layer have a rectangular shape in a plan view, and the first inclined portion is provided on an outer circumference of four sides of the positive electrode active material layer.

[15] The all-solid-state battery according to the above-described [13] in which an inclination angle of the first inclined portion is 75° or more and 87° or less with respect to an in-plane direction of the first positive electrode active material layer.

[16] The all-solid-state battery according to the above-described [13] in which the positive electrode active material layer further includes a second positive electrode active material layer formed on the other main surface of the positive electrode current collector, the inclined portion further includes a second inclined portion formed on the second positive electrode active material layer, and the second inclined portion is provided at least on an outer circumference of two sides of the second positive electrode active material layer facing each other.

[17] The all-solid-state battery according to the above-described [16] in which the second positive electrode active material layer has a rectangular shape in a plan view, and the second inclined portion is provided on an outer circumference of four sides of the second positive electrode active material layer.

[18] The all-solid-state battery according to the above-described [16] in which an inclination angle of the second inclined portion is 75° or more and 87° or less with respect to an in-plane direction of the second positive electrode active material layer.

[19] The all-solid-state battery according to the above-described [16] in which the inclined portion is configured as a tapered portion defined by the first inclined portion and the second inclined portion in a side view of the all-solid-state battery positive electrode.

According to the present disclosure, a yield of the all-solid-state battery can be improved and improvement in initial performance, deterioration characteristics, and furthermore, an energy density can be achieved.

DETAILED DESCRIPTION OF THE INVENTION

Hereinafter, embodiments of the present disclosure will be described in detail with reference to the drawings.

Figure 1:
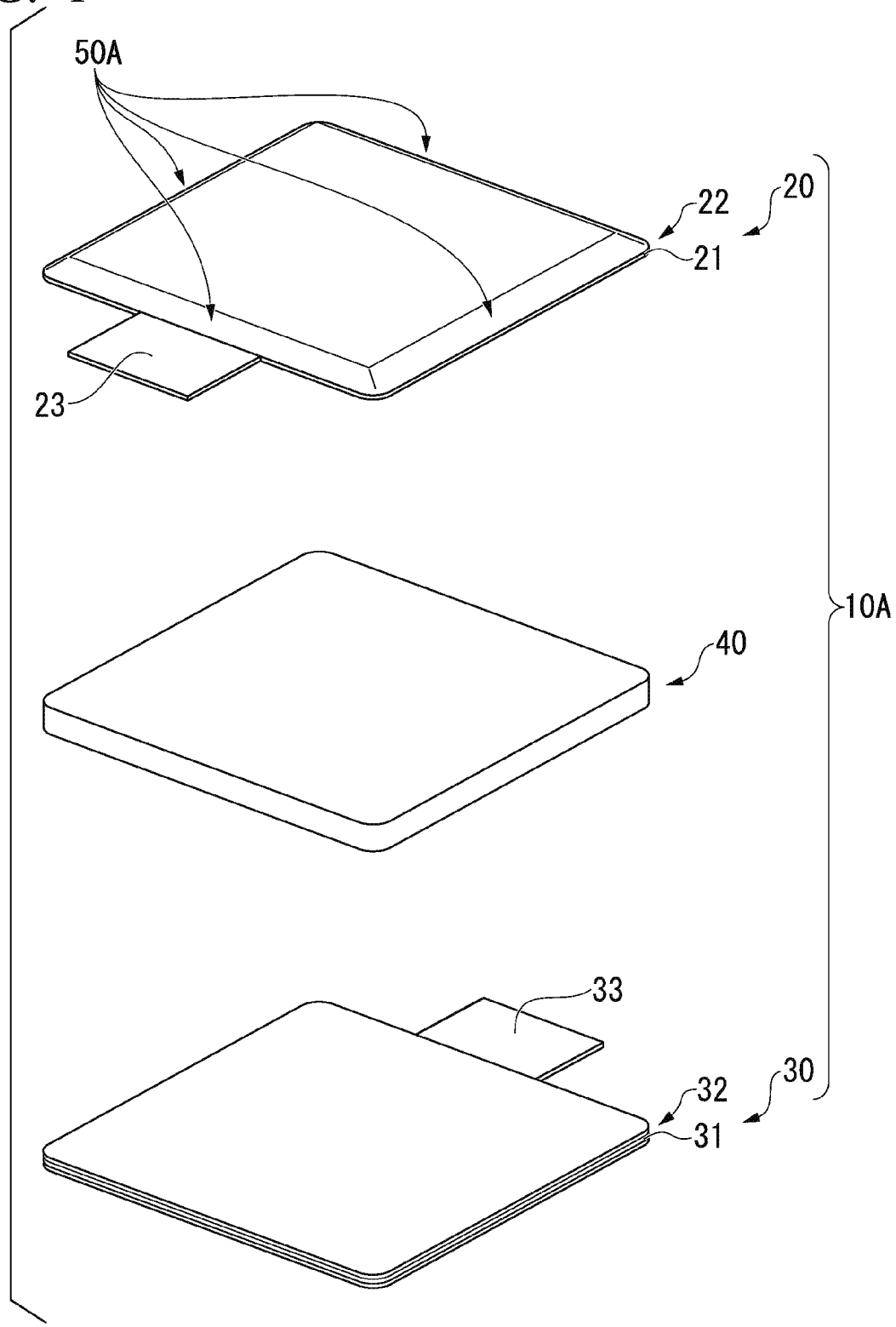
FIG. 1 is an exploded perspective view showing an example of a configuration of a laminate unit including an all-solid-state battery positive electrode according to a first embodiment of the present disclosure.

FIG. 1 is an exploded perspective view showing an example of a configuration of a laminate unit including an all-solid-state battery positive electrode according to a first embodiment of the present disclosure, FIG. 2(a) is a cross-sectional view of the all-solid-state battery positive electrode, a solid electrolyte layer, and an all-solid-state battery negative electrode that constitute the laminate unit of FIG. 1, and FIG. 2(b) is a cross-sectional view of a state in which the all-solid-state battery positive electrode, the solid electrolyte layer, and the all-solid-state battery negative electrode of FIG. 2(a) are laminated. In the drawings used in the following description, there are cases in which characteristic portions are enlarged for convenience of illustration so that characteristics thereof can be easily understood, and dimensional proportions or the like of respective constituent elements are not limited to those shown.

A laminate unit 10A includes an all-solid-state battery positive electrode 20, an all-solid-state battery negative electrode 30, and a solid electrolyte layer 40 disposed between the all-solid-state battery positive electrode 20 and the all-solid-state battery negative electrode 30. In the laminate to be described below, the all-solid-state battery positive electrode 20 and the all-solid-state battery negative electrode 30 are alternately laminated with the solid electrolyte layer 40 interposed therebetween (see FIG. 7). When lithium ions transfer between the all-solid-state battery positive electrode 20 and the all-solid-state battery negative electrode 30 via the solid electrolyte layer 40, charging and discharging of the all-solid-state battery is performed.

The laminate unit 10A has, for example, a rectangular shape in a plan view, and the all-solid-state battery positive electrode 20, the solid electrolyte layer 40, and the all-solid-state battery negative electrode 30 constituting the laminate unit 10A also have a rectangular shape in a plan view.

The all-solid-state battery positive electrode 20 includes a positive electrode current collector 21 and a positive electrode active material layer 22 formed on the positive electrode current collector 21. In the present embodiment, the positive electrode active material layer 22 includes positive electrode active material layers 22A and 22B (a first positive electrode active material layer and a second positive electrode active material layer) formed on both main surfaces of the positive electrode current collector 21 (FIG. 2).

The positive electrode current collector 21 is preferably formed of at least one material having high conductivity. As a material having high conductivity, a metal or alloy such as stainless steel containing at least one metal element of, for example, silver (Ag), palladium (Pd), gold (Au), platinum (Pt), aluminum (Al), copper (Cu), chromium (Cr), and nickel (Ni), or a non-metal of carbon (C) are exemplary examples. When manufacturing costs are considered in addition to the high conductivity, aluminum, nickel, or stainless steel is preferable. Further, aluminum does not easily react with a positive electrode active material, a negative electrode active material, and a solid electrolyte. Therefore, when aluminum is used for the positive electrode current collector 21, an internal resistance of the all-solid-state battery can be reduced.

As a form of the positive electrode current collector 21, a foil form, a plate form, or the like are exemplary examples. Also, in order to enhance adhesion to the positive electrode active material layer 22, carbon or the like may be disposed on the surfaces of the positive electrode current collector 21, or the surfaces may be roughened. Also, a form of the positive electrode current collector 21 may be a mesh form, a nonwoven fabric form, a foam form, or the like. In this case, the positive electrode current collector 21 can be provided integrally with the positive electrode active material layer 22.

Figure 2:
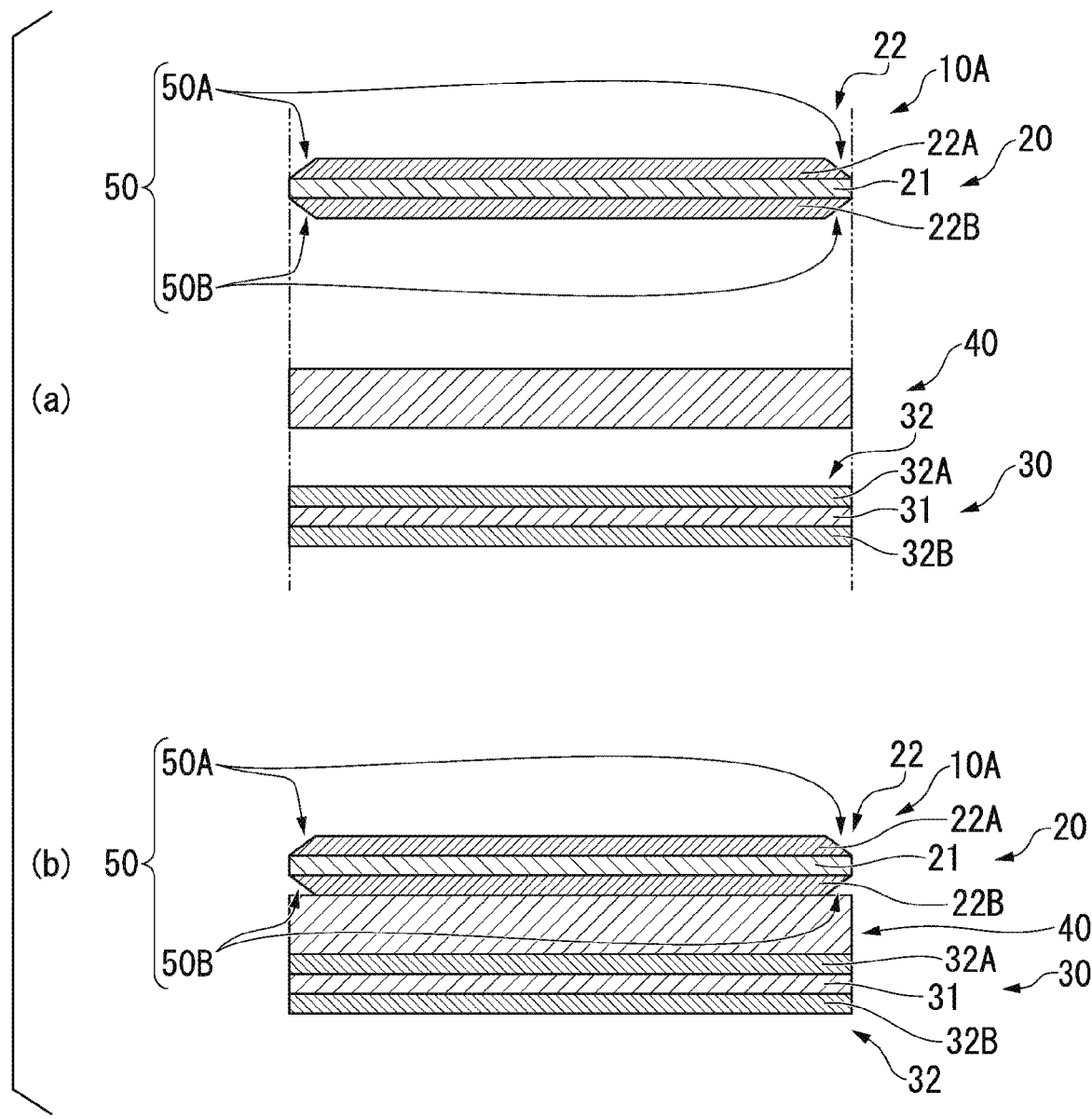
FIG. 2(a) is a cross-sectional view of the all-solid-state battery positive electrode, a solid electrolyte layer, and an all-solid-state battery negative electrode that constitute the laminate unit of FIG. 1.
FIG. 2(b) is a cross-sectional view of a state in which the all-solid-state battery positive electrode, the solid electrolyte layer, and the all-solid-state battery negative electrode of FIG. 2(a) are laminated.

The positive electrode active material layer 22 includes an inclined portion 50 provided on an outer circumference thereof (FIG. 2). Specifically, the inclined portion 50 has four first inclined portions 50A formed on the positive electrode active material layer 22A (see FIG. 1) and four second inclined portions 50B formed on the positive electrode active material layer 22B.

The four first inclined portions 50A are provided on the outer circumference of four sides of the positive electrode active material layer 22A. Similarly, the four second inclined portions 50B are provided on the outer circumference of four sides of the positive electrode active material layer 22B.

Figure 3:
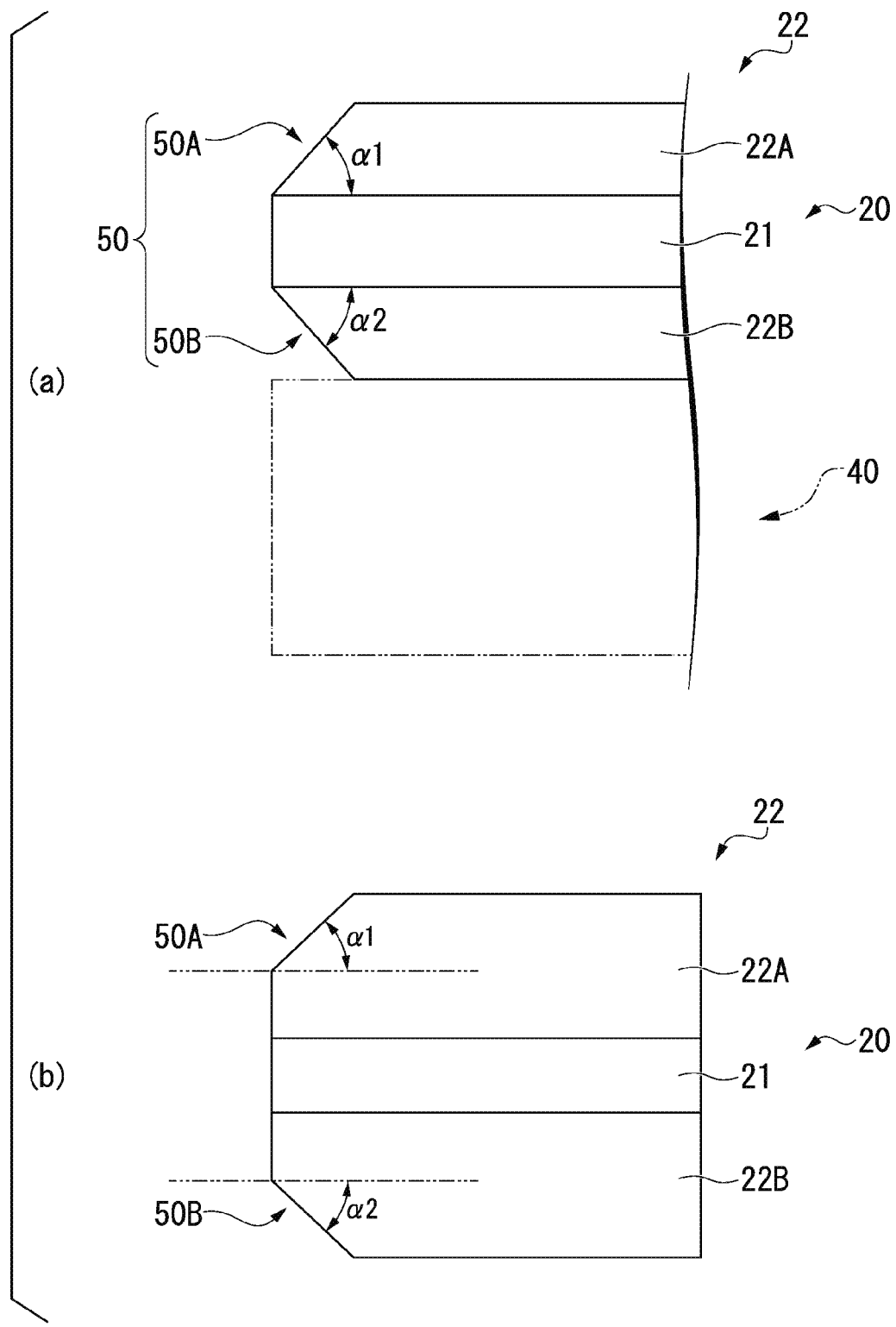
FIG. 3(a) is an enlarged side view of a first inclined portion and a second inclined portion provided on an outer circumference of the all-solid-state battery positive electrode in FIG. 2(b)
FIG. 3(b) is an enlarged side view showing a modified example of FIG. 3(a).

FIG. 3(a) is an enlarged side view of the first inclined portion 50A and the second inclined portion 50B provided on the outer circumference of the all-solid-state battery positive electrode 20 in FIG. 2(b).

An inclination angle $\alpha 1$ of the first inclined portion 50A is preferably, for example, 75° or more and 87° or less with respect to an in-plane direction of the positive electrode active material layer 22A ($75° \leq \alpha 1 \leq 87°$). When the inclination angle $\alpha 1$ of the first inclined portion 50A is 75° or more, variations in surface pressure applied to the all-solid-state battery positive electrode 20 at the time of press-forming the laminate to be described below can be sufficiently prevented. Also, when the inclination angle $\alpha 1$ of the first inclined portion 50A is 87° or less, a basis weight (filling amount) of the positive electrode active material layer 22A on the outer circumference of the all-solid-state battery positive electrode 20 can be sufficiently reduced.

In the same manner as described above, an inclination angle $\alpha 2$ of the second inclined portion 50B is preferably, for example, 75° or more and 87° or less with respect to an in-plane direction of the positive electrode active material layer 22B ($75° \leq \alpha 2 \leq 87°$). When the inclination angle $\alpha 2$ of the second inclined portion 50B is 75° or more, variations in surface pressure applied to the all-solid-state battery positive electrode 20 at the time of press-forming the laminate to be described below can be sufficiently prevented. Also, when the inclination angle $\alpha 2$ of the second inclined portion 50B is 87° or less, a basis weight (filling amount) of the positive electrode active material layer 22B on the outer circumference of the all-solid-state battery positive electrode 20 can be sufficiently reduced. The inclination angle $\alpha 1$ of the first inclined portion 50A and the inclination angle $\alpha 2$ of the second inclined portion 50B may be the same as or different from each other.

The positive electrode active material layer 22 need only have the first inclined portion 50A and the second inclined portion 50B on the outer circumference of the positive electrode active material layer 22, and a form of the first inclined portion 50A and the second inclined portion 50B is not particularly limited. For example, the first inclined portion 50A is formed to span from one main surface to the other main surface of the positive electrode active material layer 22A in FIG. 3(a), but the present disclosure is not limited thereto, and the first inclined portion 50A may be formed to span from one main surface to a lateral surface of the positive electrode active material layer 22A as shown in FIG. 3(b). In the same manner, the second inclined portion 50B may be formed to span from one main surface to a lateral surface of the positive electrode active material layer 22B. Also, in FIG. 3(a) and FIG. 3(b), both the first inclined portion 50A and the second inclined portion 50B have a planar shape, but the present disclosure is not limited thereto, and either or both of the first inclined portion 50A and the second inclined portion 50B may have a curved surface shape.

Figure 4:
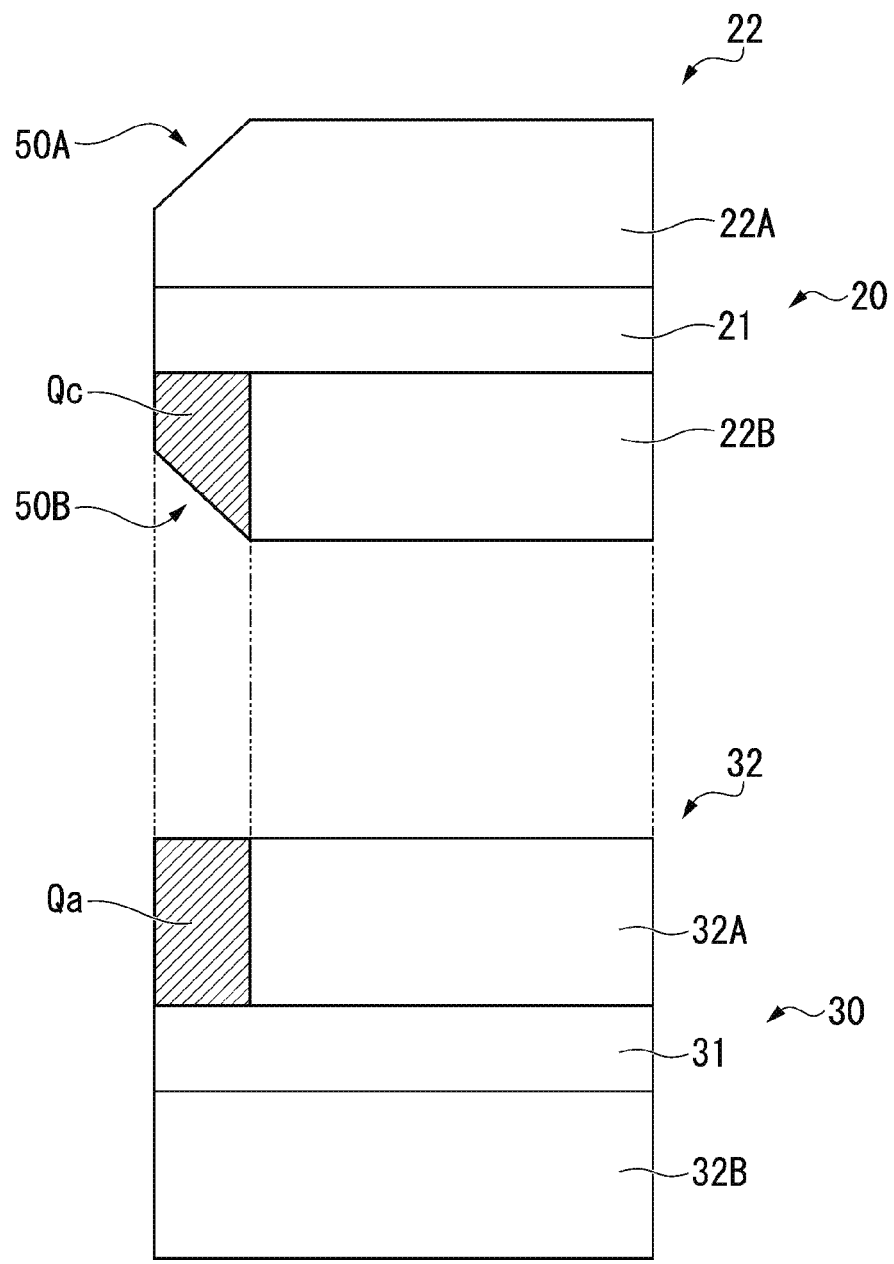
FIG. 4 is an enlarged side view showing a ratio of electrical capacity of the all-solid-state battery positive electrode to that of the all-solid-state battery negative electrode in FIG. 3(b).

Also, as shown in FIG. 4, a ratio (capacity ratio) Qa/Qc of an electrical capacity Qc (mAh) of the positive electrode active material layer 22 at a portion in which the first inclined portion 50A and the second inclined portion 50B are formed on the outer circumference of the positive electrode active material layer 22 to an electrical capacity Qa (mAh) of a negative electrode active material layer 32 at a portion of an outer circumference of the negative electrode active material layer 32 facing the second inclined portion 50B (or the first inclined portion 50A) may be 1.0 or more (Qa/Qc≥1.0) and is preferably 1.2 or more (Qa/Qc≥1.2).

Also, the inclined portion 50 is preferably configured as a tapered portion defined by the first inclined portion 50A and the second inclined portion 50B in a side view of the all-solid-state battery positive electrode 20. At this time, for example, the inclination angle α1 of the first inclined portion 50A may be the same as the inclination angle α2 of the second inclined portion 50B. Thus, variations in surface pressure applied to the all-solid-state battery positive electrode 20 can be sufficiently prevented while the basis weight (filling amount) of the positive electrode active material layer 22 on the outer circumference of the all-solid-state battery positive electrode 20 can be sufficiently reduced. Also, when a shape of the all-solid-state battery positive electrode 20 has symmetry with respect to a center position in a thickness direction in a side view of the all-solid-state battery positive electrode 20, a manufacturing process of the all-solid-state battery positive electrode 20 can be simplified.

Figure 5:
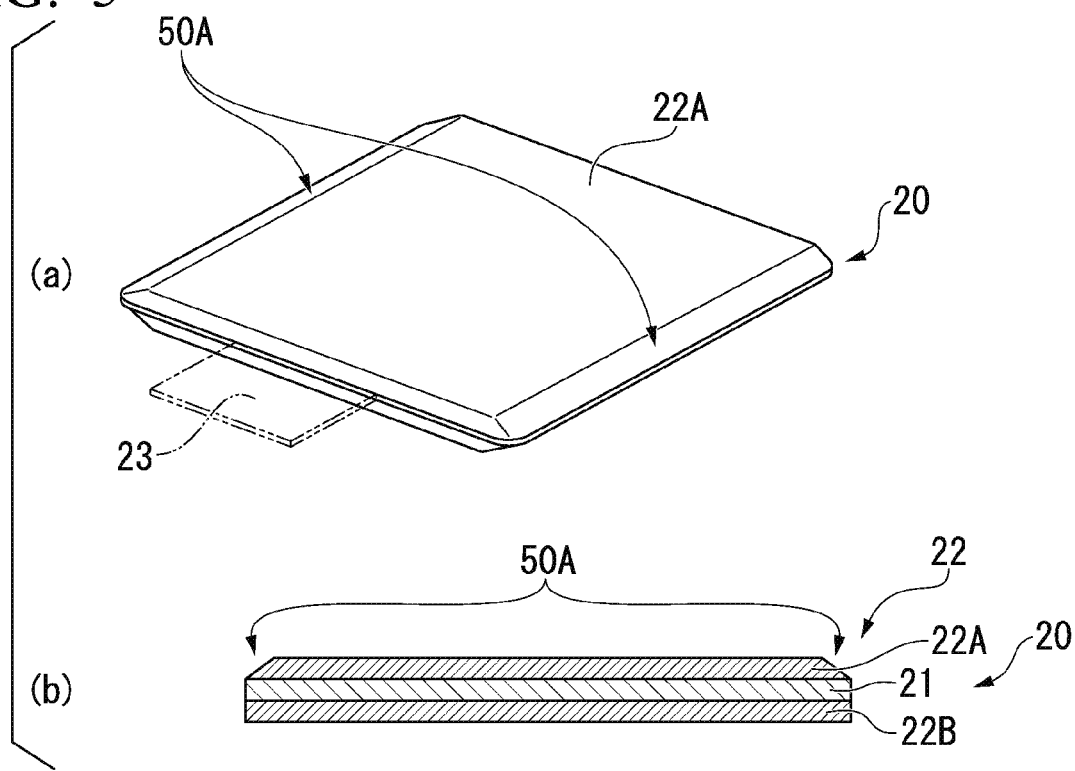
FIG. 5(a) is a perspective view showing a modified example of the inclined portion in FIG. 2(a)
FIG. 5(b) is a cross-sectional view of another modified example of the inclined portion in FIG. 2(a).

In the present embodiment, the inclined portion 50 has the four first inclined portions 50A formed on the positive electrode active material layer 22A, but the present disclosure is not limited thereto. For example, as shown in FIG. 5(a), the inclined portion 50 may have two first inclined portions 50A formed on the positive electrode active material layer 22A. In this case, the first inclined portion 50A is provided on the outer circumference of two sides of the positive electrode active material layer 22A facing each other.

Also, in the present embodiment, the positive electrode active material layer 22A has a rectangular shape in a plan view, but the present disclosure is not limited thereto, and may have other shapes such as a polygonal shape. In this case, the inclined portion 50 can have at least two first inclined portions 50A formed on the positive electrode active material layer 22A. Then, the first inclined portions 50A may be provided at least on the outer circumference of two sides of the positive electrode active material layer 22A facing each other.

As described above, when two or more first inclined portions 50A are symmetrically disposed in a plan view of the positive electrode active material layer 22A, variations in surface pressure applied to the all-solid-state battery positive electrode 20 at the time of press-forming the laminate to be described below can be prevented.

Also, in the present embodiment, the inclined portion 50 has the four second inclined portions 50B formed on the positive electrode active material layer 22B, but the present disclosure is not limited thereto. As in the case of the positive electrode active material layer 22A, the inclined portion 50 may further have two second inclined portions 50B formed on the positive electrode active material layer 22B. In this case, the second inclined portion 50B is provided on the outer circumference of two sides of the positive electrode active material layer 22B facing each other.

Also, in the present embodiment, the positive electrode active material layer 22B has a rectangular shape in a plan view, but the present disclosure is not limited thereto, and may have other shapes such as a polygonal shape. In this case, the inclined portion 50 can further have at least two second inclined portions 50B formed on the positive electrode active material layer 22B. Then, the second inclined portions 50B may be provided at least on the outer circumference of two sides of the positive electrode active material layer 22B facing each other.

As described above, when two or more second inclined portions 50B are symmetrically disposed in a plan view of the positive electrode active material layer 22B, variations in surface pressure applied to the all-solid-state battery positive electrode 20 at the time of press-forming the laminate to be described below can be prevented.

Also, in the present embodiment, the inclined portion 50 has the four first inclined portions 50A formed on the positive electrode active material layer 22A (see FIG. 1) and the four second inclined portions 50B formed on the positive electrode active material layer 22B, but the present disclosure is not limited thereto. As shown in FIG. 5(b), the inclined portion 50 may not have the second inclined portion on the positive electrode active material layer 22B while having four first inclined portions 50A formed on the positive electrode active material layer 22A. Even with this configuration, a basis weight (filling amount) of the positive electrode active material layer 22A on the outer circumference of the all-solid-state battery positive electrode 20 can be reduced.

The positive electrode active material layers 22A and 22B contain a positive electrode active material that allows transfer of lithium ions and electrons thereto and therefrom. The positive electrode active material is not particularly limited as long as the material can release and occlude lithium ions reversibly and can transport electrons, and a known positive electrode active material applicable to a positive electrode layer of an all-solid-state lithium ion battery can be used. Complex oxides such as lithium cobalt oxide ($LiCoO_2$), lithium nickel oxide ($LiNiO_2$), lithium manganese oxide ($LiMn_2O_4$), solid solution oxide ($Li_2MnO_3$-$LiMO_2$ (M=Co, Ni, or the like)), lithium-manganese-nickel-cobalt oxide ($LiNi_{1/3}Mn_{1/3}Co_{1/3}O_2$), and olivine-type lithium iron phosphate ($LiFePO_4$); conductive polymers such as polyaniline and polypyrrole; sulfides such as $Li_2S$, CuS, Li—Cu—S compounds, $TiS_2$, FeS, $MoS_2$, and Li—Mo—S compounds; a mixture of sulfur and carbon; or the like are exemplary examples. The positive electrode active material may be formed of one of the above-described materials alone or may be formed of two or more thereof.

The positive electrode active material layers 22A and 22B include a solid electrolyte that allows lithium ions to be transferred to and from the positive electrode active material. The solid electrolyte is not particularly limited as long as it has lithium ion conductivity, and a material generally used for all-solid-state lithium ion batteries can be used. Inorganic solid electrolytes such as a sulfide solid electrolyte material, an oxide solid electrolyte material, or a lithium-containing salt, polymer-based solid electrolytes such as polyethylene oxide, gel-based solid electrolytes containing a lithium-containing salt or ionic liquids having lithium ion conductivity, or the like are exemplary examples. The solid electrolyte may be formed of one of the above-described materials alone or may be formed of two or more thereof.

The solid electrolyte included in the positive electrode active material layers 22A and 22B may be the same as or different from a solid electrolyte included in negative electrode active material layers 32A and 32B or in the solid electrolyte layer 40.

The positive electrode active material layers 22A and 22B may contain a conductive auxiliary agent from a viewpoint of improving conductivity of the all-solid-state battery positive electrode 20. As the conductive auxiliary agent, a conductive auxiliary agent that can generally be used for all-solid-state lithium ion batteries can be used. Carbon black such as acetylene black or Ketjen black; carbon fibers; vapor-grown carbon fibers; graphite powder; or carbon materials such as carbon nanotubes are exemplary examples. The conductive auxiliary agent may be formed of one of the above-described materials alone or may be formed of two or more thereof.

Also, the positive electrode active material layers 22A and 22B may contain a binder having a role of binding the positive electrode active materials to each other and binding the positive electrode active material and the current collector.

In the present embodiment, the positive electrode active material layers 22A and 22B are formed on both main surfaces of the positive electrode current collector 21, but the present disclosure is not limited thereto, and one of the positive electrode active material layers 22A and 22B may be formed on one main surface of the positive electrode current collector 21. When the all-solid-state battery positive electrode 20 is a single-sided coated electrode, a laminated positive electrode that is laminated such that positive electrode current collector surfaces of two sheets of positive electrodes are combined may be used as a double-sided coated electrode.

The all-solid-state battery negative electrode 30 includes a negative electrode current collector 31 and the negative electrode active material layer 32 formed on the negative electrode current collector 31. In the present embodiment, the negative electrode active material layer 32 includes the negative electrode active material layers 32A and 32B formed on both main surfaces of the negative electrode current collector 31 (FIG. 2).

As in the positive electrode current collector 21, the negative electrode current collector 31 is preferably formed of at least one material having high conductivity. As the material having high conductivity, a metal or alloy such as stainless steel containing at least one metal element of, for example, silver (Ag), palladium (Pd), gold (Au), platinum (Pt), aluminum (Al), copper (Cu), chromium (Cr), and nickel (Ni), or a non-metal of carbon (C) are exemplary examples. When manufacturing costs are considered, copper, nickel, or stainless steel is preferable. Further, stainless steel does not easily react with a positive electrode active material, a negative electrode active material, and a solid electrolyte. Therefore, when stainless steel is used for the negative electrode current collector 31, internal resistance of the all-solid-state battery can be reduced.

As a form of the negative electrode current collector 31, a foil form, a plate form, and the like are exemplary examples. Also, in order to enhance adhesion to the negative electrode active material layer 32, carbon or the like may be disposed on the surfaces of the negative electrode current collector 31, or the surfaces may be roughened. Also, a form of the negative electrode current collector 31 may be a mesh form, a nonwoven fabric form, or a foam form. In this case, the negative electrode current collector 31 is provided integrally with the negative electrode active material layer 32.

The negative electrode active material layers 32A and 32B contain a negative electrode active material that allows transfer of lithium ions and electrons thereto and therefrom. The negative electrode active material is not particularly limited as long as the material can release and occlude lithium ions reversibly and can transport electrons, and a known negative electrode active material applicable to a negative electrode layer of an all-solid-state lithium ion battery can be used. Carbonaceous materials such as natural graphite, artificial graphite, resinous coal, carbon fibers, activated carbon, hard carbon, and soft carbon; alloy-based materials mainly formed of tin, tin alloy, silicon, silicon alloy, gallium, gallium alloy, indium, indium alloy, aluminum, aluminum alloy, and the like; conductive polymers such as polyacene, polyacetylene, and polypyrrole; metallic lithium; and lithium-titanium complex oxides (for example, $Li_4Ti_5O_{12}$), or the like are exemplary examples. These negative electrode active materials may be formed of one of the above-described materials alone or may be formed of two or more thereof.

The negative electrode active material layers 32A and 32B include a solid electrolyte that allows lithium ions to be transferred to and from the negative electrode active material. The solid electrolyte is not particularly limited as long as it has lithium ion conductivity, and materials generally used for all-solid-state lithium ion batteries can be used. Inorganic solid electrolytes such as a sulfide solid electrolyte material, an oxide solid electrolyte material, and a lithium-containing salt, polymer-based solid electrolytes such as polyethylene oxide, gel-based solid electrolytes containing a lithium-containing salt or ionic liquids having lithium ion conductivity, or the like are exemplary examples. The solid electrolyte may be formed of one of the above-described materials alone or may be formed of two or more thereof.

The solid electrolyte included in the negative electrode active material layers 32A and 32B may be the same as or different from the solid electrolyte included in the positive electrode active material layers 22A and 22B or in the solid electrolyte layer 40.

The negative electrode active material layers 32A and 32B may contain a conductive auxiliary agent, a binder, or the like. Although there is no particular limitation on these materials, for example, the same materials as those used for the positive electrode active material layers 22A and 22B described above can be used.

In the present embodiment, the negative electrode active material layers 32A and 32B are formed on both main surfaces of the negative electrode current collector 31, but the present disclosure is not limited thereto, and one of the negative electrode active material layers 32A and 32B may be formed on one main surface of the negative electrode current collector 31. For example, when the all-solid-state battery negative electrode 30 is formed at a lowermost layer in a lamination direction of the laminate to be described below, there is no all-solid-state battery positive electrode 20 to face below the all-solid-state battery negative electrode 30 positioned at the lowermost layer. Therefore, in the all-solid-state battery negative electrode 30 positioned at the lowermost layer, the negative electrode active material layer 32A may be formed only on one-side surface on an upper side in the lamination direction.

In the present embodiment, the negative electrode active material layers 32A and 32B are formed on both main surfaces of the negative electrode current collector 31, but the present disclosure is not limited thereto, and when metallic lithium, an alloy-based material, or the like is used as the negative electrode active material layers 32A and 32B, the negative electrode active material layers 32A and 32B may be used as the negative electrode current collector 31. In that case, the negative electrode active material layers 32A and 32B may or may not include a solid electrolyte that allows lithium ions to be transferred to and from the negative electrode active material. Further, the negative electrode current collector may or may not be used. That is, the negative electrode active material layer 32 may also serve as the negative electrode current collector 31.

The solid electrolyte layer 40 is formed of, for example, a solid electrolyte sheet containing a solid electrolyte.

The solid electrolyte sheet of the present embodiment includes a porous substrate and a solid electrolyte held by the porous substrate. Although there is no particular limitation on a form of the porous substrate, a woven fabric, a nonwoven fabric, a mesh cloth, a porous membrane, an expanding sheet, a punching sheet, and the like are exemplary examples. Among these forms, a nonwoven fabric is preferable from a viewpoint of holding force of the solid electrolyte and handleability.

The porous substrate described above is preferably formed of an insulating material. Thereby, insulating properties of the solid electrolyte sheet can be improved. As the insulating material, a resin material such as nylon, polyester, polyethylene, polypropylene, polytetrafluoroethylene, ethylene-tetrafluoroethylene copolymer, polyvinylidene fluoride, polyvinylidene chloride, polyvinyl chloride, polyurethane, vinylon, polybenzimidazole, polyimide, polyphenylene sulfite, polyetheretherketone, cellulose, or acrylic resin; natural fibers such as hemp, wood pulp, or cotton linters; glass, or the like is an exemplary example.

The solid electrolyte described above is not particularly limited as long as it has lithium ion conductivity and insulating properties, and materials generally used for all-solid-state lithium ion batteries can be used. For example, inorganic solid electrolytes such as a sulfide solid electrolyte material, an oxide solid electrolyte material, and a lithium-containing salt, polymer-based solid electrolytes such as polyethylene oxide, gel-based solid electrolytes containing a lithium-containing salt or ionic liquids having lithium ion conductivity, or the like is an exemplary example. Although there is no particular limitation on a form of the solid electrolyte material, a particulate form is an exemplary example.

Although the solid electrolyte sheet of the present embodiment has a porous substrate, the present disclosure is not limited thereto, and the solid electrolyte sheet may be formed of a solid electrolyte without having a porous substrate. For example, a solid electrolyte sheet formed of a solid electrolyte can be prepared by applying a solid electrolyte slurry onto a coating substrate such as a polyethylene terephthalate (PET) film, drying it, performing rolling processing as necessary, and then peeling it off from the coating substrate.

Also, the solid electrolyte layer 40 may also be formed by applying the solid electrolyte slurry onto a main surface of the all-solid-state battery positive electrode 20 or the all-solid-state battery negative electrode 30 that faces a counter electrode, drying it, and performing rolling processing as necessary. The solid electrolyte layer 40 may be provided on one of the all-solid-state battery positive electrode 20 and the all-solid-state battery negative electrode 30 or may be provided on both.

The solid electrolyte layer 40 may contain a pressure-sensitive adhesive for imparting a mechanical strength or flexibility.

Figure 6:
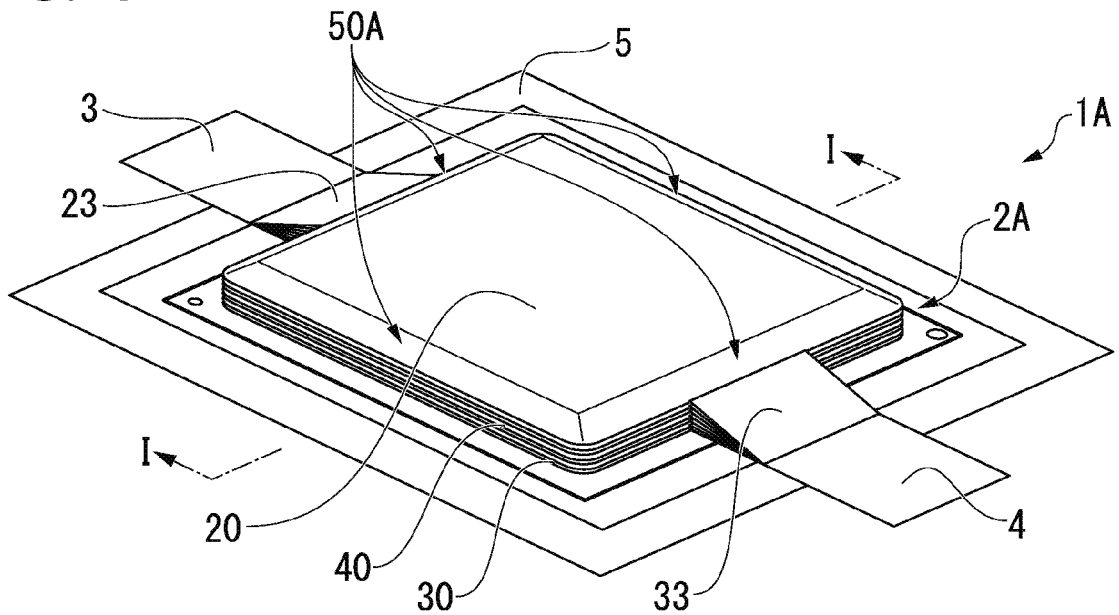
FIG. 6 is a perspective view showing an example of a configuration of a lamination-type all-solid-state battery including the all-solid-state battery positive electrode of FIG. 1.
Figure 7:
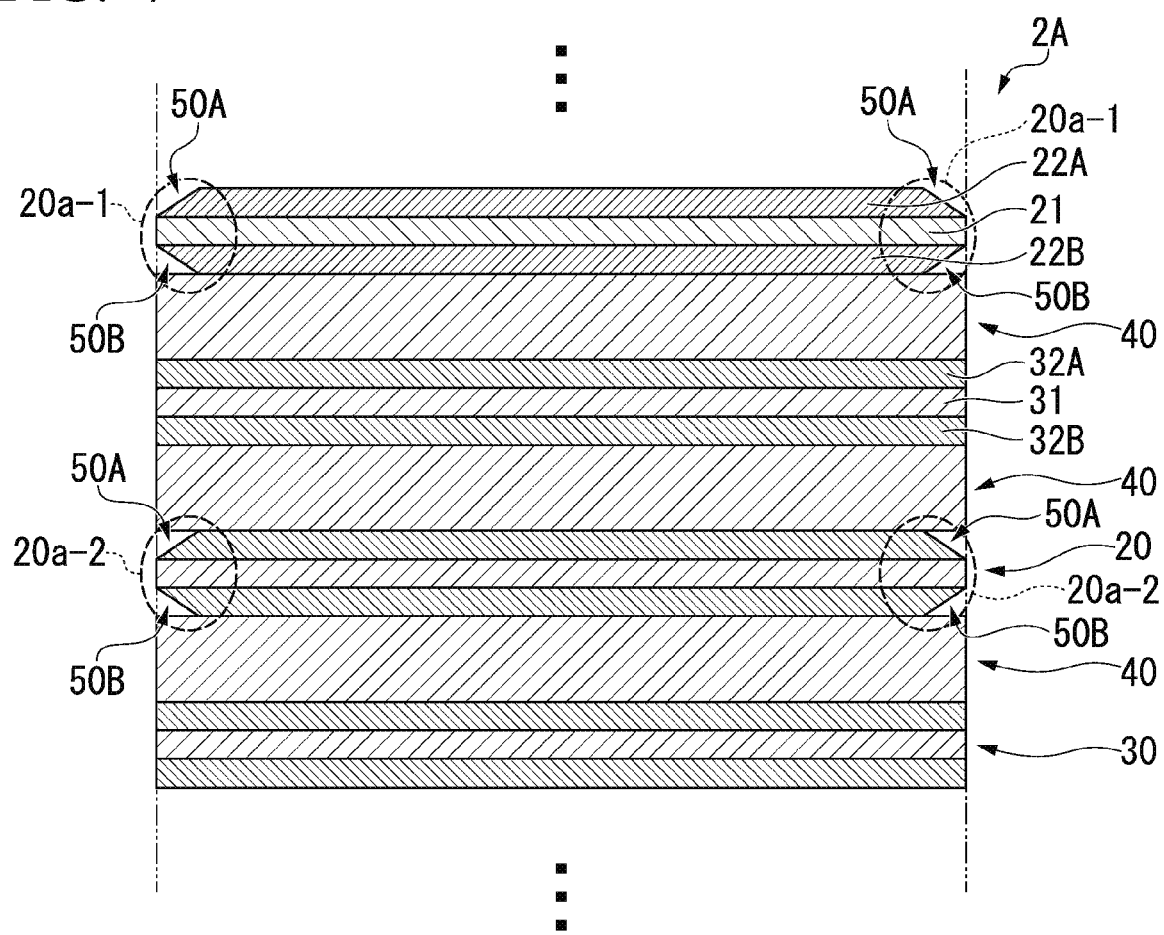
FIG. 7 is a partial cross-sectional view taken along line I-I of a laminate constituting the all-solid-state battery of FIG. 6.

FIG. 6 is a perspective view showing an example of a configuration of a lamination-type all-solid-state battery including the all-solid-state battery positive electrode 20 of FIG. 1, and FIG. 7 is a partial cross-sectional view taken along line I-I of a laminate constituting the all-solid-state battery of FIG. 6. As the lamination-type all-solid-state battery, an all-solid-state lithium ion secondary battery, an all-solid-state sodium ion secondary battery, an all-solid-state magnesium ion secondary battery, and the like are exemplary examples.

An all-solid-state battery 1A includes a laminate 2A in which the all-solid-state battery positive electrode 20 and the all-solid-state battery negative electrode 30 are alternately laminated and the solid electrolyte layer 40 is interposed between the all-solid-state battery positive electrode 20 and the all-solid-state battery negative electrode 30. A lead-out electrode 23 of the all-solid-state battery positive electrode 20 is connected to an external electrode 3, and a lead-out electrode 33 of the all-solid-state battery negative electrode 30 is connected to an external electrode 4. The laminate 2A is housed in an exterior material 5 such as a film in a sealed state. Protective layers (not shown) may be laminated on an uppermost layer and a lowermost layer of the laminate 2A.

The all-solid-state battery 1A includes the all-solid-state battery positive electrode 20, the all-solid-state battery negative electrode 30, and the solid electrolyte layer 40 disposed between the all-solid-state battery positive electrode 20 and the all-solid-state battery negative electrode 30. Configurations of the all-solid-state battery positive electrode 20, the all-solid-state battery negative electrode 30, and the solid electrolyte layer 40 are the same as those described above, and thus a description thereof will be omitted.

In the all-solid-state battery 1A, it is preferable that areas of the all-solid-state battery positive electrode 20, solid electrolyte layer 40, and the all-solid-state battery negative electrode 30 be substantially the same as each other on a plane of projection when they are projected in a lamination direction. At this time, it is more preferable that shapes of the all-solid-state battery positive electrode 20, solid electrolyte layer 40, and the all-solid-state battery negative electrode 30 be substantially the same as each other on the above-described plane of projection. As described above, even when the areas of the all-solid-state battery positive electrode 20, and the all-solid-state battery negative electrode 30 are substantially the same, since the inclined portion 50 (the first inclined portion 50A and the second inclined portion 50B) is provided on the outer circumferences of the positive electrode active material layers 22A and 22B, basis weights of outer circumferential end portions 20a-1, 20a-2, and the like in which the inclined portion 50 (the first inclined portion 50A and the second inclined portion 50B) is provided are each smaller than a basis weight of a central part of the all-solid-state battery positive electrode 20, and thus electrolytic deposition of lithium in a vicinity of the outer circumferential end portions 20a-1, 20a-2, and the like of the all-solid-state battery positive electrode 20 is suppressed. Also, even when a relative positional deviation between the all-solid-state battery positive electrode 20 and the all-solid-state battery negative electrode 30 occurs to some extent at the time of forming the laminate 2A, since ion conduction is suppressed to some extent right above or just below the inclined portion 50 (the first inclined portion 50A and the second inclined portion 50B), electrolytic deposition of lithium can be suppressed. However, the areas of the all-solid-state battery positive electrode 20, solid electrolyte layer 40, and the all-solid-state battery negative electrode 30 do not necessarily required to be substantially the same on the plane of projection when they are projected in a lamination direction of the all-solid-state battery 1A.

Next, a method of manufacturing the lamination-type all-solid-state battery 1A will be described.

First, a positive electrode mixture is prepared by mixing, for example, a positive electrode active material, a solid electrolyte, a conductive auxiliary agent, and a binder, and a positive electrode mixture slurry in which the positive electrode mixture is dispersed in a predetermined solvent is manufactured. Next, a positive electrode layer precursor (green sheet) is manufactured by applying the positive electrode mixture slurry onto both surfaces of the positive electrode current collector 21, the solvent is dried thereafter, which is then compressed using a roll press machine or the like, and thereby a positive electrode active material layer is formed on both main surfaces of the positive electrode current collector 21. Next, using a roller that is inclined with respect to an in-plane direction of the positive electrode active material layer described above, an outer circumference of one positive electrode active material layer is compressed to form the first inclined portion 50A, and an outer circumference of the other positive electrode active material layer is compressed to form the second inclined portion SOB. Thereby, the all-solid-state battery positive electrode 20 including the first inclined portion 50A and the second inclined portion SOB is manufactured. Then, a plurality of all-solid-state battery positive electrodes 20 are prepared.

In the step of manufacturing the positive electrode described above, at least two first inclined portions 50A are formed on one positive electrode active material layer. Also, the first inclined portion 50A is formed at least on the outer circumference of two sides of the one positive electrode active material layer facing each other. In the same manner, at least two second inclined portions SOB can be formed on the other positive electrode active material layer. Also, the second inclined portion SOB can be formed at least on the outer circumference of two sides of the other positive electrode active material layer facing each other.

Also, in the step of manufacturing the positive electrode described above, only the outer circumference of the one positive electrode active material layer may be compressed to form the first inclined portion 50A, and the second inclined portion SOB may not be formed on the other positive electrode active material layer.

Next, a negative electrode mixture is prepared by mixing, for example, a negative electrode active material, a solid electrolyte, and a binder, and a negative electrode mixture slurry in which the negative electrode mixture is dispersed in a predetermined solvent is manufactured. Then, a negative electrode layer precursor (green sheet) is manufactured by applying the negative electrode mixture slurry onto the negative electrode current collector 31, the solvent is dried thereafter, which is then compressed using a roll press machine or the like to form the negative electrode active material layers 32A and 32B, and thereby the all-solid-state battery negative electrode 30 is manufactured. Then, a plurality of all-solid-state battery negative electrodes 30 are prepared.

Next, a solid electrolyte slurry in which a solid electrolyte is dispersed in a predetermined solvent is manufactured. Then, a solid electrolyte layer precursor (green sheet) is manufactured by applying the solid electrolyte slurry onto a porous substrate, the solvent is dried thereafter, which is then compressed using a roll press machine or the like, and thereby the solid electrolyte layer 40 formed of a solid electrolyte sheet is manufactured. Then, a plurality of solid electrolyte layers 40 (solid electrolyte sheets) are prepared.

Thereafter, a laminate is formed by alternately laminating the all-solid-state battery positive electrode 20 and the all-solid-state battery negative electrode 30 and interposing the solid electrolyte layer 40 (solid electrolyte sheet) between the all-solid-state battery positive electrode 20 and the all-solid-state battery negative electrode 30. Then, the laminate 2A is formed by pressing the laminate in a vertical direction by press forming, and thereby the all-solid-state battery 1A including the laminate 2A is obtained. At this time, it is preferable to press-form the above-described laminate with end surfaces of the all-solid-state battery positive electrode 20, solid electrolyte layer 40, and the all-solid-state battery negative electrode 30 aligned (FIG. 7). Thereby, entire main surfaces of the solid electrolyte layer 40 are uniformly pressed by the all-solid-state battery positive electrode 20 and the all-solid-state battery negative electrode 30, and thus occurrence of cracks or defects at an end portion of the solid electrolyte layer 40 is suppressed. Also, since a relative positional deviation between the all-solid-state battery positive electrode 20 and the all-solid-state battery negative electrode 30 at the time of press-forming the laminate 2A does not easily occur, electrolytic deposition of lithium is suppressed.

As described above, according to the present embodiment, since the positive electrode active material layer 22 has the inclined portion 50 provided on the outer circumference thereof, basis weights of the outer circumferential end portions 20a-1, 20a-2, and the like of the positive electrode active material layer 22 are reduced, and thus electrolytic deposition of lithium or the like in the vicinity of the outer circumferential end portions 20a-1, 20a-2, and the like of the all-solid-state battery positive electrode 20 can be suppressed when the laminate 2A is formed using the all-solid-state battery positive electrode 20. Also, when the areas of the all-solid-state battery positive electrode 20, solid electrolyte layer 40, and the all-solid-state battery negative electrode 30 are substantially the same on the plane of projection described above, an unpressed portion at the outer circumferential end portion of the solid electrolyte layer 40 does not easily occur at the time of press-forming the laminate 2A, the laminate 2A can be formed with uniform surface pressure in an in-plane direction of the solid electrolyte layer 40, occurrence of cracks or defects at the end portion of the solid electrolyte layer 40 can be suppressed, and thereby a yield of the all-solid-state battery 1A can be improved. Also, even when the all-solid-state battery positive electrode 20 or the all-solid-state battery negative electrode 30 repeatedly expands and contracts when the all-solid-state battery 1A is used, occurrence of cracks and fissures in the portion can be suppressed. Further, since it is possible to form the laminate 2A at a pressure higher than that in conventional cases, a dead space can be reduced by increasing a filling factor of the solid electrolyte constituting the solid electrolyte layer 40, and an initial performance, deterioration characteristics, and furthermore, an energy density of the all-solid-state battery 1A can be improved.

Figure 8:
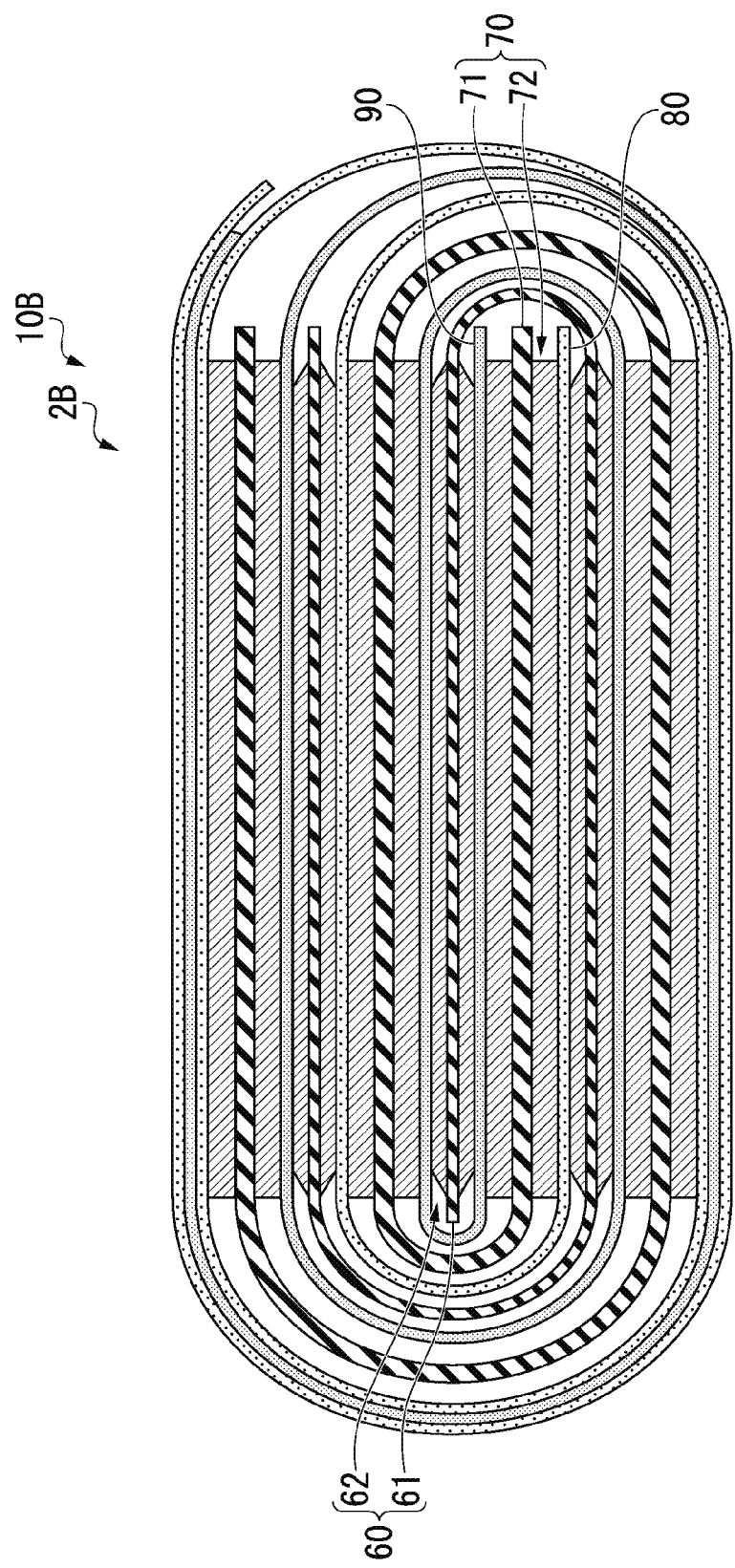
FIG. 8 is a cross-sectional view showing an example of a configuration of an all-solid-state battery electrode group including an all-solid-state battery positive electrode according to a second embodiment of the present disclosure.

FIG. 8 is a cross-sectional view showing an example of a configuration of an all-solid-state battery electrode group including an all-solid-state battery positive electrode according to a second embodiment of the present disclosure. In the second embodiment, an all-solid-state battery positive electrode applied to a wound type all-solid-state battery will be described as an example. As the wound type all-solid-state battery, an all-solid-state lithium ion secondary battery, an all-solid-state sodium ion secondary battery, an all-solid-state magnesium ion secondary battery, and the like are exemplary examples.

As shown in FIG. 8, an all-solid-state battery electrode group 10B is formed of a laminate 2B which includes an all-solid-state battery positive electrode 60 having a positive electrode active material layer 62 formed on an elongated positive electrode current collector 61 and an all-solid-state battery negative electrode 70 having a negative electrode active material layer 72 formed on an elongated negative electrode current collector 71, and in which the all-solid-state battery positive electrode 60 and the all-solid-state battery negative electrode 70 are wound in a flat shape.

Figure 9:
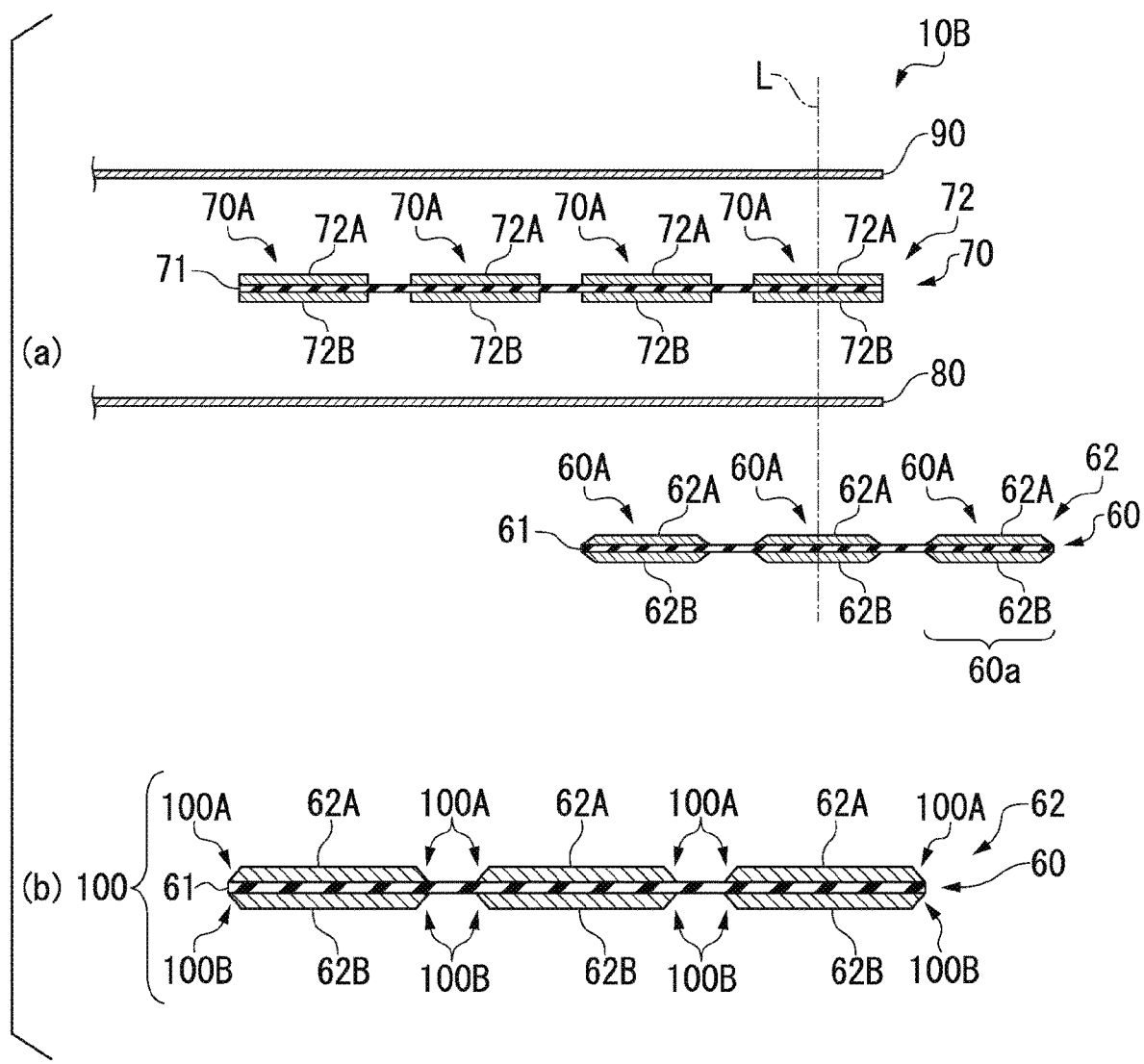
FIG. 9(a) is an exploded cross-sectional view of a state in which the all-solid-state battery electrode group in FIG. 8 is spread.
FIG. 9(b) is an enlarged cross-sectional view of the all-solid-state battery positive electrode in FIG. 8.

As shown in FIGS. 9(a) and 9(b), the all-solid-state battery positive electrode 60 includes, for example, the positive electrode current collector 61 and a plurality of positive electrode active material layers 62A and 62B (first positive electrode active material layers and second positive electrode active material layers) formed on both main surfaces of the positive electrode current collector 61 and formed intermittently in a longitudinal direction thereof. In the present embodiment, a pair of positive electrode active material layers 62A and 62B formed on both main surfaces of the positive electrode current collector 61 define an all-solid-state battery positive electrode unit 60A, and a plurality of all-solid-state battery positive electrode units 60A constitute the all-solid-state battery positive electrode 60. However, the all-solid-state battery positive electrode 60 may include a plurality of positive electrode active material layers 62A (or a plurality of positive electrode active material layers 62B) that are intermittently formed on only one main surface of the positive electrode current collector 61.

The positive electrode active material layers 62A and 62B constituting the all-solid-state battery positive electrode unit 60A have, for example, a rectangular shape in a plan view. However, the present disclosure is not limited thereto, and the positive electrode active material layers 62A and 62B may have other shapes such as a polygonal shape in a plan view.

A material forming the positive electrode current collector 61 can be the same as that of the positive electrode current collector 21 in the first embodiment described above. Also, a material forming the positive electrode active material layers 62A and 62B can be the same as that of the positive electrode active material layers 22A and 22B in the first embodiment described above.

The positive electrode active material layers 62A and 62B each have an inclined portion 100 provided on an outer circumference thereof (FIG. 9(b)). Specifically, the inclined portion 100 has four first inclined portions 100A formed on the positive electrode active material layer 62A and four second inclined portions 100B formed on the positive electrode active material layer 62B.

The four first inclined portions 100A are provided on the outer circumference of four sides of the positive electrode active material layer 62A. Also, in the same manner, the four second inclined portions 100B are provided on the outer circumference of four sides of the positive electrode active material layer 62B.

An inclination angle of the first inclined portion 100A is preferably, for example, 75° or more and 87° or less with respect to an in-plane direction of the positive electrode active material layer 62A. When the inclination angle of the first inclined portion 100A is 75° or more, variations in surface pressure applied to the all-solid-state battery positive electrode 60 at the time of press-forming a laminate to be described below can be sufficiently prevented. Also, when the inclination angle of the first inclined portion 100A is 87° or less, a basis weight (filling amount) of the positive electrode active material layer 62A on the outer circumference of the all-solid-state battery positive electrode 60 can be sufficiently reduced.

Similarly to the above, an inclination angle of the second inclined portion 100B is preferably, for example, 75° or more and 87° or less with respect to an in-plane direction of the positive electrode active material layer 62B. When the inclination angle of the second inclined portion 100B is 75° or more, variations in surface pressure applied to the all-solid-state battery positive electrode 60 at the time of press-forming the laminate to be described below can be sufficiently prevented. Also, when the inclination angle of the second inclined portion 100B is 87° or less, a basis weight (filling amount) of the positive electrode active material layer 62B on the outer circumference of the all-solid-state battery positive electrode 60 can be sufficiently reduced. The inclination angle of the first inclined portion 100A and the inclination angle of the second inclined portion 100B may be the same as or different from each other.

Also, the inclined portion 100 is preferably configured as a tapered portion defined by the first inclined portion 100A and the second inclined portion 100B in a side view of the all-solid-state battery positive electrode 60. At this time, for example, the inclination angle of the first inclined portion 100A may be the same as the inclination angle $\alpha 2$ of the second inclined portion 100B. Thereby, variations in surface pressure applied to the all-solid-state battery positive electrode 60 can be sufficiently prevented while a basis weight (filling amount) of the positive electrode active material layer 62 on the outer circumference of the all-solid-state battery positive electrode 60 can be sufficiently reduced. Also, when a shape of the all-solid-state battery positive electrode 60 has symmetry with respect to a center position in a thickness direction in a side view of the all-solid-state battery positive electrode 60, a manufacturing process of the all-solid-state battery positive electrode 60 can be simplified.

In the present embodiment, the inclined portion 100 has the four first inclined portions 100A formed on the positive electrode active material layer 62A, but the present disclosure is not limited thereto. For example, the inclined portion 100 may have two first inclined portions 100A formed on the positive electrode active material layer 62A. In this case, the first inclined portion 100A is provided on the outer circumference of two sides of the positive electrode active material layer 62A facing each other.

Also, in the present embodiment, the positive electrode active material layer 62A has a rectangular shape in a plan view, but the present disclosure is not limited thereto, and may have other shapes such as a polygonal shape. In this case, the inclined portion 100 can have at least two first inclined portions 100A formed on the positive electrode active material layer 62A. Then, the first inclined portion 100A may be provided at least on the outer circumference of two sides of the positive electrode active material layer 62A facing each other.

As described above, when two or more first inclined portions 100A are symmetrically disposed in a plan view of the positive electrode active material layer 62A, variations in surface pressure applied to the all-solid-state battery positive electrode 60 at the time of press-forming the laminate to be described below can be prevented.

Figure 10:
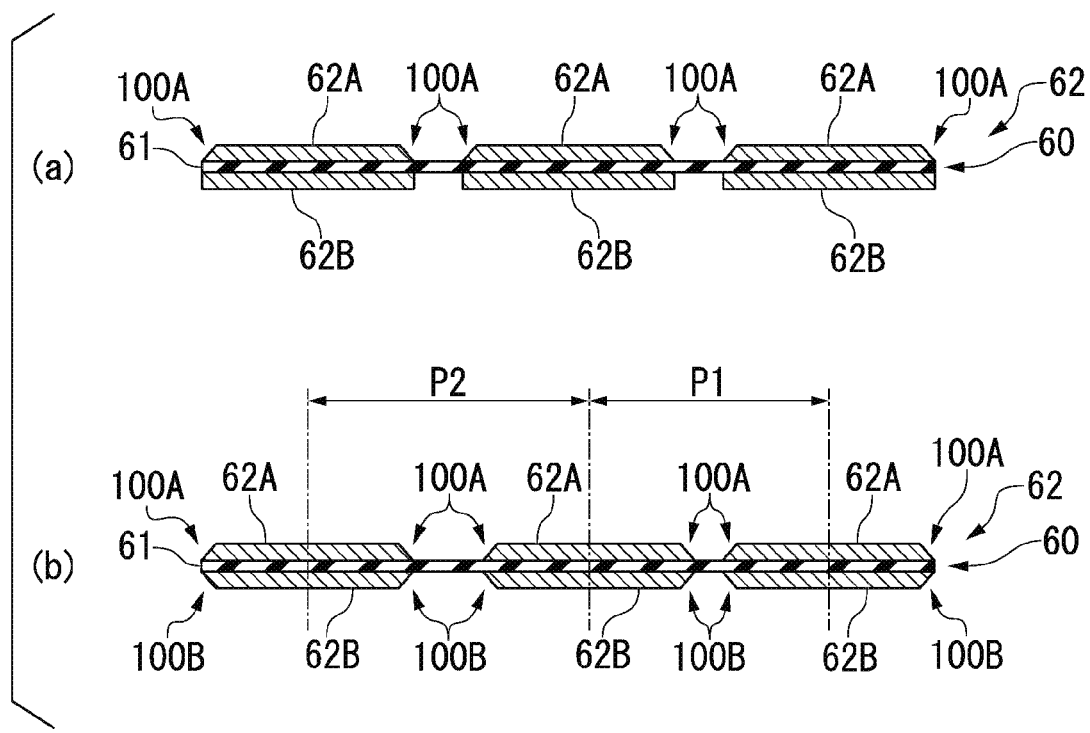
FIG. 10(a) is a cross-sectional view showing a modified example of the all-solid-state battery positive electrode in FIG. 9.
FIG. 10(b) is a cross-sectional view showing another modified example of the all-solid-state battery positive electrode.

Also, in the present embodiment, the inclined portion 100 has the four first inclined portions 100A formed on the positive electrode active material layer 62A and the four second inclined portions 100B formed on the positive electrode active material layer 62B, but the present disclosure is not limited thereto. As shown in FIG. 10(a), the inclined portion 100 may not have the second inclined portion on the positive electrode active material layer 62B while having four first inclined portions 100A formed on the positive electrode active material layer 62A. Even with this configuration, a basis weight (filling amount) of the positive electrode active material layer 62A on the outer circumference of the all-solid-state battery positive electrode 60 can be reduced.

Also, an arrangement pitch of the plurality of positive electrode active material layers 62A and 62B is basically uniform, but the arrangement pitch may vary. For example, as shown in FIG. 10(b), an arrangement pitch of adjacent positive electrode active material layers 62A and 62A (or adjacent positive electrode active material layers 62B and 62B) preferably increases from one end toward the other end in a longitudinal direction of the all-solid-state battery positive electrode 60 (P1<P2). In other words, it is preferable that an interval between adjacent positive electrode active material layers 62A and 62A (or adjacent positive electrode active material layers 62B and 62B) increase from one end (longitudinal end portion 60a) toward the other end in the longitudinal direction of the all-solid-state battery positive electrode 60. Thereby, the all-solid-state battery positive electrode 60 can easily be wound, and weight reduction and cost reduction can be achieved by providing the positive electrode active electrolyte as little as possible in a folded portion that does not function as a battery.

The all-solid-state battery negative electrode 70 includes the elongated negative electrode current collector 71 and a plurality of negative electrode active material layers 72A and 72B formed on both main surfaces of the negative electrode current collector 71 and formed intermittently in a longitudinal direction thereof (FIG. 9(a)). In the present embodiment, a pair of negative electrode active material layers 72A and 72B define an all-solid-state battery negative electrode unit 70A, and a plurality of all-solid-state battery negative electrode unit 70A constitute the all-solid-state battery negative electrode 70. However, the all-solid-state battery negative electrode 70 may include a plurality of negative electrode active material layers 72A (or a plurality of negative electrode active material layers 72B) that are continuously or intermittently formed on only one main surface of the negative electrode current collector 71.

The negative electrode active material layers 72A and 72B constituting the all-solid-state battery negative electrode unit 70A have, for example, a rectangular shape in a plan view. However, the present disclosure is not limited thereto, and the negative electrode active material layers 72A and 72B may have other shapes such as a polygonal shape in a plan view.

A material forming the negative electrode current collector 71 can be the same as that forming the negative electrode current collector 31 in the first embodiment described above. Also, a material forming the negative electrode active material layers 72A and 72B can be the same as that of the negative electrode active material layers 32A and 32B in the first embodiment described above.

In the laminate 2B, the plurality of positive electrode active material layers 62 and the plurality of negative electrode active material layers 72 are alternately disposed with respect to a lamination direction of the laminate 2B in a state in which the all-solid-state battery positive electrode 60 and the all-solid-state battery negative electrode 70 are wound (FIG. 8). At this time, electrodes positioned on outermost layers (for example, an uppermost layer and a lowermost layer) of the laminate 2B are preferably the all-solid-state battery negative electrode layer 70 having the negative electrode active material layer 72.

The all-solid-state battery electrode group 10B includes an elongated first solid electrolyte layer 80 disposed between the all-solid-state battery positive electrode 60 and the all-solid-state battery negative electrode 70, and a second solid electrolyte layer 90 disposed on a side of the all-solid-state battery negative electrode 70 opposite to the first solid electrolyte layer 80 (FIGS. 8 and 9(a)).

The first solid electrolyte layer 80 and the second solid electrolyte layer 90 are formed of a solid electrolyte sheet containing a solid electrolyte. Materials forming the first solid electrolyte layer 80 and the second solid electrolyte layer 90 can be the same as that of the solid electrolyte layer 40 in the first embodiment described above.

Figure 11:
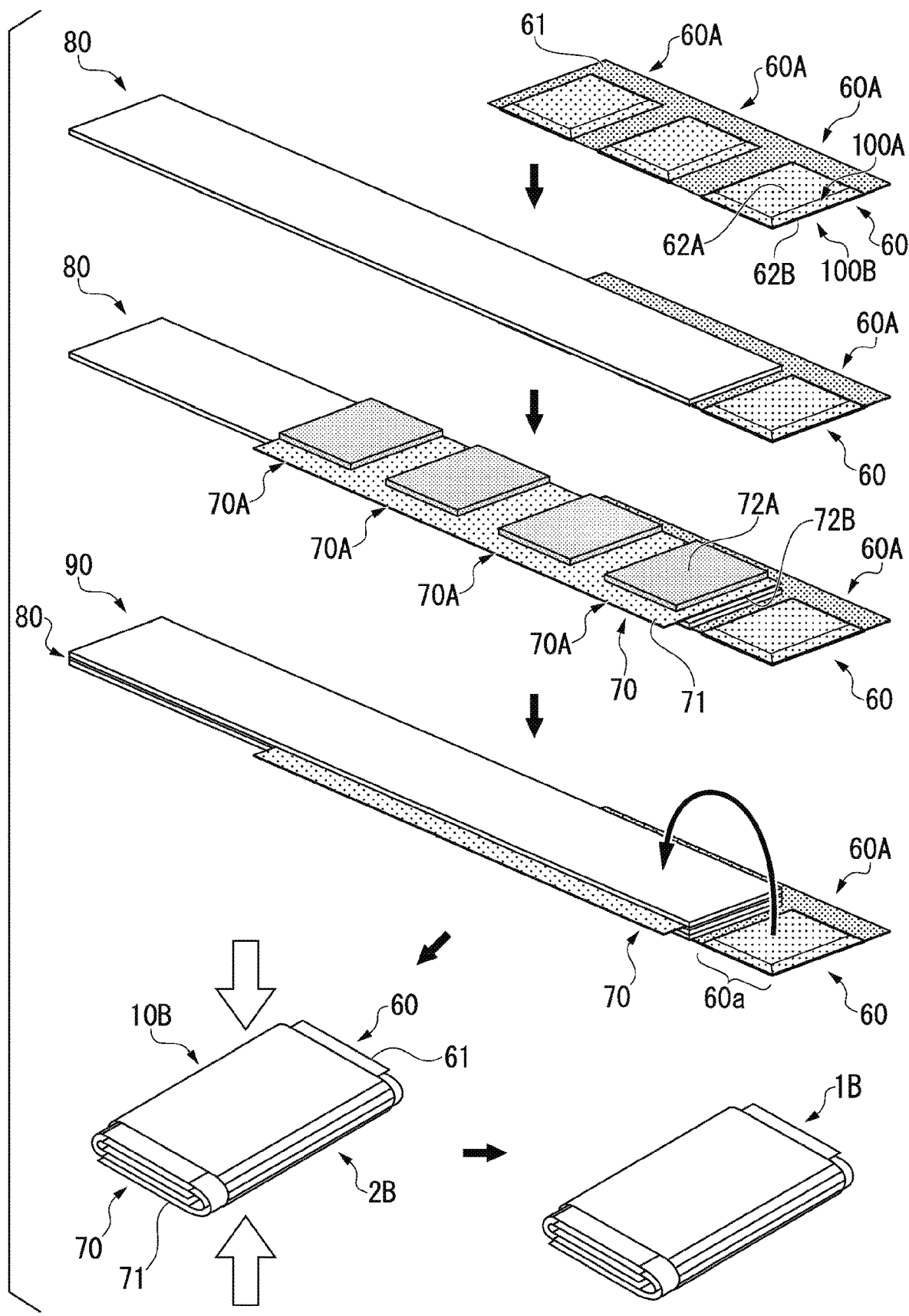
FIG. 11 is a perspective view showing an example of a method of manufacturing an all-solid-state battery including the all-solid-state battery electrode group of FIG. 8.

FIG. 11 is a perspective view showing an example of a method of manufacturing a wound type battery including the all-solid-state battery electrode group 10B of FIG. 8.

First, a positive electrode mixture is prepared by mixing, for example, a positive electrode active material, a solid electrolyte, a conductive auxiliary agent, and a binder, and a positive electrode mixture slurry in which the positive electrode mixture is dispersed in a predetermined solvent is manufactured. Next, a positive electrode layer precursor (green sheet) is manufactured by intermittently applying the positive electrode mixture slurry onto both main surfaces of the elongated (strip-shaped) positive electrode current collector 61 in a longitudinal direction thereof, the solvent is dried thereafter, which is then compressed using a roll press machine or the like, and thereby the positive electrode active material layers 62A and 62B are formed on both main surfaces of the positive electrode current collector 61. Next, using a roller that is inclined with respect to an in-plane direction of the positive electrode active material layer described above, an outer circumference of one positive electrode active material layer is compressed to form the first inclined portion 100A, and an outer circumference of the other positive electrode active material layer is compressed to form the second inclined portion 100B. Thereby, the all-solid-state battery positive electrode 60 having the first inclined portion 100A and the second inclined portion 100B is manufactured. Then, the all-solid-state battery positive electrode 60 having a plurality of all-solid-state battery positive electrode units 60A is manufactured.

In the step of manufacturing the positive electrode described above, at least two first inclined portions 100A are formed on one positive electrode active material layer. Also, the first inclined portion 100A is formed at least on the outer circumference of two sides of the one positive electrode active material layer facing each other. In the same manner, at least two second inclined portions 100B can be formed on the other positive electrode active material layer. Also, the second inclined portion 100B can be formed at least on the outer circumference of two sides of the other positive electrode active material layer facing each other.

Also, in the step of manufacturing the positive electrode described above, only the first inclined portion 100A may be formed by compressing the outer circumference of the one positive electrode active material layer, and the second inclined portion 100B may not be formed on the other positive electrode active material layer.

Next, a solid electrolyte layer precursor (green sheet) is manufactured by continuously applying a solid electrolyte slurry onto a strip-shaped porous substrate in the longitudinal direction, the solvent is dried thereafter, which is then compressed using a roll press machine or the like, and thereby the first solid electrolyte layer 80 is manufactured.

In the step of manufacturing the first solid electrolyte layer 80 described above, the solid electrolyte layer precursor (green sheet) may also be manufactured by intermittently applying the solid electrolyte slurry onto the strip-shaped porous substrate in the longitudinal direction.

Next, a negative electrode mixture is prepared by mixing, for example, a negative electrode active material, a solid electrolyte, and a binder, and a negative electrode mixture slurry in which the negative electrode mixture is dispersed in a predetermined solvent is manufactured. Then, a negative electrode layer precursor (green sheet) is manufactured by intermittently applying the negative electrode mixture slurry onto both main surfaces of the elongated (strip-shaped) negative electrode current collector 71, the solvent is dried thereafter, which is then compressed using a roll press machine or the like to form the negative electrode active material layers 72A and 72B, and then the all-solid-state battery negative electrode 70 having a plurality of all-solid-state battery negative electrode units 70A is manufactured.

Further, in the same manner as in the first solid electrolyte layer 80, a solid electrolyte layer precursor (green sheet) is manufactured by continuously applying a solid electrolyte slurry onto a strip-shaped porous substrate in the longitudinal direction, the solvent is dried thereafter, which is then compressed using a roll press machine or the like, and thereby the second solid electrolyte layer 90 is manufactured.

In the step of manufacturing the second solid electrolyte layer 90 described above, the solid electrolyte layer precursor (green sheet) may also be manufactured by intermittently applying the solid electrolyte slurry onto the strip-shaped porous substrate in the longitudinal direction.

Thereafter, in a state in which the all-solid-state battery positive electrode 60, the first solid electrolyte layer 80, the all-solid-state battery negative electrode 70, and the second solid electrolyte layer 90 are laminated in this order, these are wound to form the laminate. At this time, the all-solid-state battery positive electrode 60 including the positive electrode active material layers 62A and 62B formed on the elongated positive electrode current collector 61 and the all-solid-state battery negative electrode 70 including the negative electrode active material layers 72A and 72B formed on the elongated negative electrode current collector 71 are laminated in a state of being deviated from each other in the longitudinal direction so that winding start positions of the all-solid-state battery positive electrode 60 and the all-solid-state battery negative electrode 70 are different. For example, when the all-solid-state battery positive electrode 60, the first solid electrolyte layer 80, the all-solid-state battery negative electrode 70, and the second solid electrolyte layer 90 are laminated, respective longitudinal end portions of the first solid electrolyte layer 80, the all-solid-state battery negative electrode 70, and the second solid electrolyte layer 90 are made to be positioned at a reference position L, and only the longitudinal end portion 60a of the all-solid-state battery positive electrode 60 is made to extend from the reference position L (FIG. 9(a)). Then, the longitudinal end portion 60a of the all-solid-state battery positive electrode 60 is folded back by 180 degrees, the all-solid-state battery positive electrode 60, the first solid electrolyte layer 80, the all-solid-state battery negative electrode 70, and the second solid electrolyte layer 90 are wound in a flat shape with the longitudinal end portion 60a of the all-solid-state battery positive electrode 60 as a winding core, and thereby the laminate is formed.

Thereafter, the laminate 2B is formed by pressing the laminate in a vertical direction by press forming, and thereby the all-solid-state battery electrode group 10B including the laminate 2B is obtained. Thereafter, the positive electrode current collector 61 and the negative electrode current collector 71 of the laminate 2B are respectively connected to external electrodes (not shown). Protective layers (not shown) may be laminated on an uppermost layer and a lowermost layer of the laminate 2B. Then, the laminate 2B is housed in an exterior material (not shown) such as a film in a sealed state to obtain a wound type all-solid-state battery 1B.

The wound type all-solid-state battery 1B manufactured by the above-described method includes the all-solid-state battery positive electrode 60 including the positive electrode active material layer 62 formed on the positive electrode current collector 61 and the all-solid-state battery negative electrode 70 including the negative electrode active material layer 72 formed on the negative electrode current collector 71, and the first solid electrolyte layer 80 and the second solid electrolyte layer 90 disposed between the all-solid-state battery positive electrode 60 and the all-solid-state battery negative electrode 70 (see FIG. 8).

In the all-solid-state battery 1B, it is preferable that areas of the all-solid-state battery positive electrode 60 and the all-solid-state battery negative electrode 70 be substantially the same as each other on a plane of projection when they are projected in a lamination direction. At this time, it is more preferable that shapes of the all-solid-state battery positive electrode 60 and the all-solid-state battery negative electrode 70 be substantially the same as each other on the above-described plane of projection. As described above, even when the areas of the all-solid-state battery positive electrode 60 and the all-solid-state battery negative electrode 70 are substantially the same, since the inclined portion 100 (the first inclined portion 100A and the second inclined portion 100B) is provided on the outer circumferences of the positive electrode active material layers 62A and 62B, a basis weight of outer circumferential end portion in which the inclined portion 100 (the first inclined portion 100A and the second inclined portion 100B) is provided is smaller than a basis weight of a central part of the all-solid-state battery positive electrode 60, and electrolytic deposition of lithium in the vicinity of the outer circumferential end portion of the all-solid-state battery positive electrode 60 is suppressed. Also, even when a relative positional deviation between the all-solid-state battery positive electrode 60 and the all-solid-state battery negative electrode 70 occurs to some extent at the time of forming the laminate 2B, since ion conduction is suppressed to some extent right above or just below the inclined portion 100 (the first inclined portion 100A and the second inclined portion 100B), electrolytic deposition of lithium or the like can be suppressed. However, the areas of the all-solid-state battery positive electrode 60 and the all-solid-state battery negative electrode 70 do not necessarily required to be substantially the same on the plane of projection when they are projected in a lamination direction of the all-solid-state battery 1B.

As described above, according to the present embodiment, since the positive electrode active material layer 62 has the inclined portion 100 provided on the outer circumference thereof, a basis weight of the outer circumferential end portion of the positive electrode active material layer 62 is reduced, and thus electrolytic deposition of lithium or the like in the vicinity of the outer circumferential end portion of the all-solid-state battery positive electrode 60 can be suppressed when the laminate 2B is formed using the all-solid-state battery positive electrode 60. Also, when the areas of the all-solid-state battery positive electrode 60 and the all-solid-state battery negative electrode 70 are substantially the same on the plane of projection described above, an unpressed portion at the first solid electrolyte layer 80 or the second solid electrolyte layer 90 does not easily occur at the time of press-forming the laminate 2B, the laminate 2B can be formed with uniform surface pressure in an in-plane direction of the first solid electrolyte layer 80 or the second solid electrolyte layer 90, occurrence of cracks or defects at the end portion of the first solid electrolyte layer 80 or the second solid electrolyte layer 90 can be suppressed, and thereby a yield of the all-solid-state battery 1B can be improved. Also, even when the all-solid-state battery positive electrode 60 or the all-solid-state battery negative electrode 70 repeatedly expands and contracts when the all-solid-state battery 1B is used, occurrence of cracks and fissures in the portion can be suppressed. Further, since it is possible to form the laminate 2B at a pressure higher than that in conventional cases, a dead space can be reduced by increasing a filling factor of the solid electrolyte constituting the first solid electrolyte layer 80 or the second solid electrolyte layer 90, and thus an initial performance, deterioration characteristics, and furthermore, an energy density of the all-solid-state battery 1B can be improved.

While embodiments of the present disclosure have been described above in detail, the present disclosure is not limited to the above embodiments, and various modifications and changes can be made within the gist of the present disclosure described in the claim.

What is claimed is:

1. An all-solid-state battery comprising:
    an all-solid-state battery positive electrode comprising a positive electrode active material layer formed on a positive electrode current collector;
    an all-solid-state battery negative electrode comprising a negative electrode active material layer formed on a negative electrode current collector; and
    a solid electrolyte layer disposed between the all-solid-state battery positive electrode and the all-solid-state battery negative electrode,
    wherein
    the positive electrode active material layer comprises a plurality of inclined portions provided on an outer circumference thereof,
    the positive electrode active material layer comprises a first positive electrode active material layer formed on one main surface of the positive electrode current collector,
    the positive electrode active material layer further comprises a second positive electrode active material layer formed on another main surface of the positive electrode current collector,
    the first positive electrode active material layer has a rectangular shape in a plan view,
    the second positive electrode active material layer has a rectangular shape in a plan view,
    the inclined portion includes a first inclined portions formed on the first positive electrode active material layer, and a second inclined portion formed on the second positive electrode active material layer,
    the inclined portion is configured as a tapered portion defined by the first inclined portion and the second inclined portion in which an inclination angle of the first inclined portion and an inclination angle of the second inclined portion are same as each other with respect to an in-plane direction of the positive electrode active material layer, in a side view of the all-solid-state battery positive electrode, and
    a ratio Qa/Qc of an electrical capacity Qc (mAh) of the positive electrode active material layer to an electrical capacity Qa (mAh) of the negative electrode active material layer at a portion of an outer circumference of the negative electrode active material layer facing the second inclined portion or the first inclined portion is 1.0 or more.

2. The all-solid-state battery according to claim 1, wherein
    the first inclined portions are provided at least on an outer circumference of two sides of the first positive electrode active material layer facing each other.

3. The all-solid-state battery according to claim 2, wherein
    the first inclined portion is provided on an outer circumference of four sides of the positive electrode active material layer.

4. The all-solid-state battery according to claim 2, wherein
    an inclination angle of the first inclined portion is greater than or equal to 75° and less than or equal to 87° with respect to an in-plane direction of the first positive electrode active material layer.

5. The all-solid-state battery according to claim 2, wherein
    the second inclined portion is provided at least on an outer circumference of two sides of the second positive electrode active material layer facing each other.

6. The all-solid-state battery according to claim 5, wherein
    the second inclined portion is provided on an outer circumference of four sides of the second positive electrode active material layer.

7. The all-solid-state battery according to claim 5, wherein
    an inclination angle of the second inclined portion is 75° or more and 87° or less with respect to an in-plane direction of the second positive electrode active material layer.

8. An all-solid-state battery comprising:
    an all-solid-state battery positive electrode including a positive electrode active material layer formed on a positive electrode current collector;
    an all-solid-state battery negative electrode including a negative electrode active material layer formed on a negative electrode current collector; and
    a solid electrolyte layer disposed between the all-solid-state battery positive electrode and the all-solid-state battery negative electrode, wherein
    the positive electrode active material layer includes a plurality of inclined portions provided on an outer circumference thereof,
    the positive electrode active material layer includes a first positive electrode active material layer formed on one main surface of the positive electrode current collector, the positive electrode active material layer further includes a second positive electrode active material layer formed on another main surface of the positive electrode current collector, the first positive electrode active material layer has a rectangular shape in a plan view, the second positive electrode active material layer has a rectangular shape in a plan view, the inclined portion includes a first inclined portions formed on the first positive electrode active material layer, and a second inclined portion formed on the second positive electrode active material layer, areas of the all-solid-state battery positive electrode and the all-solid-state battery negative electrode are substantially the same on a plane of projection when they are projected in a lamination direction, and a ratio Qa/Qc of an electrical capacity Qc (mAh) of the positive electrode active material layer to an electrical capacity Qa (mAh) of the negative electrode active material layer at a portion of an outer circumference of the negative electrode active material layer facing the second inclined portion or the first inclined portion is 1.0 or more.

* * * * *